United States Patent
Byun

(10) Patent No.: US 10,521,352 B2
(45) Date of Patent: Dec. 31, 2019

(54) MEMORY SYSTEM AND OPERATING METHOD OF MEMORY SYSTEM

(71) Applicant: SK hynix Inc., Gyeonggi-do (KR)

(72) Inventor: Eu-Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 15/144,377

(22) Filed: May 2, 2016

(65) Prior Publication Data

US 2017/0147502 A1    May 25, 2017

(30) Foreign Application Priority Data

Nov. 23, 2015 (KR) .......................... 10-2015-0163775

(51) Int. Cl.
  *G06F 12/1009*  (2016.01)
(52) U.S. Cl.
  CPC .. *G06F 12/1009* (2013.01); *G06F 2212/1016* (2013.01); *G06F 2212/1056* (2013.01); *G06F 2212/683* (2013.01)
(58) Field of Classification Search
  CPC .................................................. G06F 12/0246
  See application file for complete search history.

(56) References Cited

U.S. PATENT DOCUMENTS

| | | | | |
|---|---|---|---|---|
| 2009/0198952 A1* | 8/2009 | Khmelnitsky | ...... | G06F 12/0246 711/206 |
| 2010/0115188 A1* | 5/2010 | Lee | ...... | G06F 12/0246 711/103 |
| 2011/0264843 A1* | 10/2011 | Haines | ...... | G06F 12/0246 711/103 |
| 2013/0166824 A1* | 6/2013 | Shim | ...... | G06F 12/0246 711/103 |
| 2013/0326121 A1* | 12/2013 | Cheng | ...... | G06F 12/0246 711/103 |
| 2014/0281172 A1* | 9/2014 | Seo | ...... | G06F 12/0246 711/103 |
| 2016/0103617 A1* | 4/2016 | Kang | ...... | G06F 12/0246 711/103 |
| 2017/0052719 A1* | 2/2017 | Boitei | ...... | G06F 3/0619 |

FOREIGN PATENT DOCUMENTS

KR  1020140050941  4/2014
KR  1020140094170  7/2014

* cited by examiner

*Primary Examiner* — Edward J Dudek, Jr.
(74) *Attorney, Agent, or Firm* — IP & T Group LLP

(57) ABSTRACT

This technology relates to a memory system for processing data into a memory device and an operating method of the same. The memory system may include a memory device comprising a plurality of memory blocks, each memory block comprising a plurality of pages each page having a plurality of memory cells coupled to a plurality of word lines, the memory device being suitable for storing data requested by a host, and a controller suitable for programming data corresponding to a first write command received from the host into a first memory block of the memory blocks, receiving a second write command for the data programmed into the first memory block from the host, performing an update program on the data programmed into the first memory block into the memory blocks, and generating a map list for the first memory block according to the update program.

14 Claims, 12 Drawing Sheets

MEMORY SYSTEM AND OPERATING METHOD OF MEMORY SYSTEM

CROSS-REFERENCE TO RELATED APPLICATION(S)

The present application claims priority of Korean Patent Application No. 10-2015-0163775, filed on Nov. 23, 2015, which is incorporated herein by reference in its entirety.

BACKGROUND

1. Field

Exemplary embodiments of the present invention relate generally to a memory system, and more particularly, to a memory system for processing data into a memory device and an operating method of the same.

2. Description of the Related Art

The computer environment paradigm has shifted to ubiquitous computing systems that can be used anywhere and at any time resulting in a rapidly increasing use of portable electronic devices such as mobile phones, digital cameras, and notebook computers continues to increase rapidly. These portable electronic devices generally use a memory system having one or more semiconductor memory devices for storing data, that is, data storage devices. A data storage device may be used as a main memory device or an auxiliary memory device of a portable electronic device.

Semiconductor memory devices provide excellent' stability, durability, high information access speed and low power consumption, since they have no moving parts. Examples of data storage devices include universal serial bus (USB) memory devices, memory cards having various interfaces, solid state drives (SSD) and so forth.

SUMMARY

Various embodiments are directed to a memory system capable to of minimizing a complexity and a performance reduction of the memory system and processing data rapidly and stably by maximizing the use efficiency of a memory device and an operating method of the memory system.

In an embodiment a memory system may include a memory device comprising a plurality of memory blocks each memory block comprising a plurality of pages each page having a plurality of memory cells coupled to a plurality of word lines, the memory device being suitable for storing data requested by a host and a controller suitable for programming data corresponding to a first write command received from the host into a first memory block of the memory blocks, receiving a second write command for the data programmed into the first memory block from the host, performing an update program on the data programmed into the first memory block into the memory blocks, and generating a map list for the first memory block according to the update program.

The controller may be further suitable for updating map data for the first memory block in accordance with the update program and storing invalid page update information about the first memory block according to the updating of the map data or the update program in the map list.

The map list may include a plurality of columns corresponding to the memory blocks, respectively, and the invalid page update information about each of the memory blocks may be stored in each of the columns of the map list in a bit map, touch map, or touch count bitmap form.

The first memory block may include closed memory blocks in which a data program for all pages of the closed memory blocks has been performed.

The controller may be suitable for checking a count indicative of the number of valid pages reduced or the number of invalid pages generated in the closed memory blocks through the map list.

The controller may be suitable for sequentially selecting the closed memory blocks as a source memory block group, wherein the selections of the closed memory blocks as the source memory block group are sequentially made from a closed memory block having a minimum count to a closed memory block having a maximum count.

The controller may be suitable for checking a valid page count (VPC) of each of the closed memory blocks selected as the source memory block group, and sequentially selecting source memory blocks from the closed memory blocks in the source memory block group, wherein the selections of the source memory blocks are made from a closed memory block having a minimum VPC to a closed memory block having a maximum VPC.

The controller may be suitable for: copying data stored in valid pages of the source memory blocks, storing the copied data in empty memory blocks, open memory blocks, or free memory blocks of the memory blocks, and generating the source memory blocks as the empty memory blocks, the open memory blocks, or the free memory blocks.

The map list may include a table in which counts have been written for each index indicative of each of the closed memory blocks.

The count may be indicative of the number of invalid pages reduced or the number of invalid pages generated in the closed memory blocks in accordance with the update program.

In an embodiment, an operating method of a memory system, may include: receiving a first write command from a host with respect to a plurality of pages included in each of a plurality of memory blocks of a memory device wherein each of the plurality of page comprises a plurality of memory cells, programming data corresponding to the write command received from the host into a first memory block of the memory blocks, receiving a second write command for the programmed data of the first memory block from the host, performing an update program on the programmed data of the first memory block into the memory blocks, and generating a map list for the first memory block in accordance with, the update program.

The generating of the map list may include: updating map data for the first memory block in accordance with the update program, and storing invalid page update information about the first memory block according to the updating of the map data or the update program in the map list.

The map list may include a plurality of columns corresponding to the memory blocks, respectively, and the invalid page update information about each of the memory blocks may be stored in each of the column of the map list in a bit map, touch map, or touch count bitmap form.

The first memory block may include closed memory blocks in which a data program for all pages of the closed memory blocks has been performed.

The operating method may further include checking a count indicative of the number of valid pages reduced or the number of invalid pages generated in the closed memory blocks through the map list.

The operating method may further include sequentially selecting the closed memory blocks as a source memory block group, wherein the selections of the closed memory blocks as the source memory block group are sequentially made from a closed memory block having a minimum count to a closed memory block having a maximum count.

The sequentially selecting of the closed memory blocks may include: checking a valid page count (VPC) of each of the closed memory blocks selected as the source memory block group, and sequentially selecting source memory blocks from the closed memory blocks in the source memory block group, wherein the selections of the source memory blocks are made from a closed memory block having a minimum VPC to a closed memory block having a maximum VPC.

The operating method may further include: copying data stored in valid pages of the source memory blocks, storing the copied data in empty memory blocks, open memory blocks, or free memory blocks of the memory blocks, and generating the source memory blocks as the empty memory blocks, the open memory blocks, or the free memory blocks.

The map list may include a table in which counts have been written for each index indicative of each of the closed memory blocks.

The count may be indicative of the number of invalid pages reduced or the number of invalid pages generated in the closed memory blocks in accordance with the update program.

DETAILED DESCRIPTION

Figure 1:
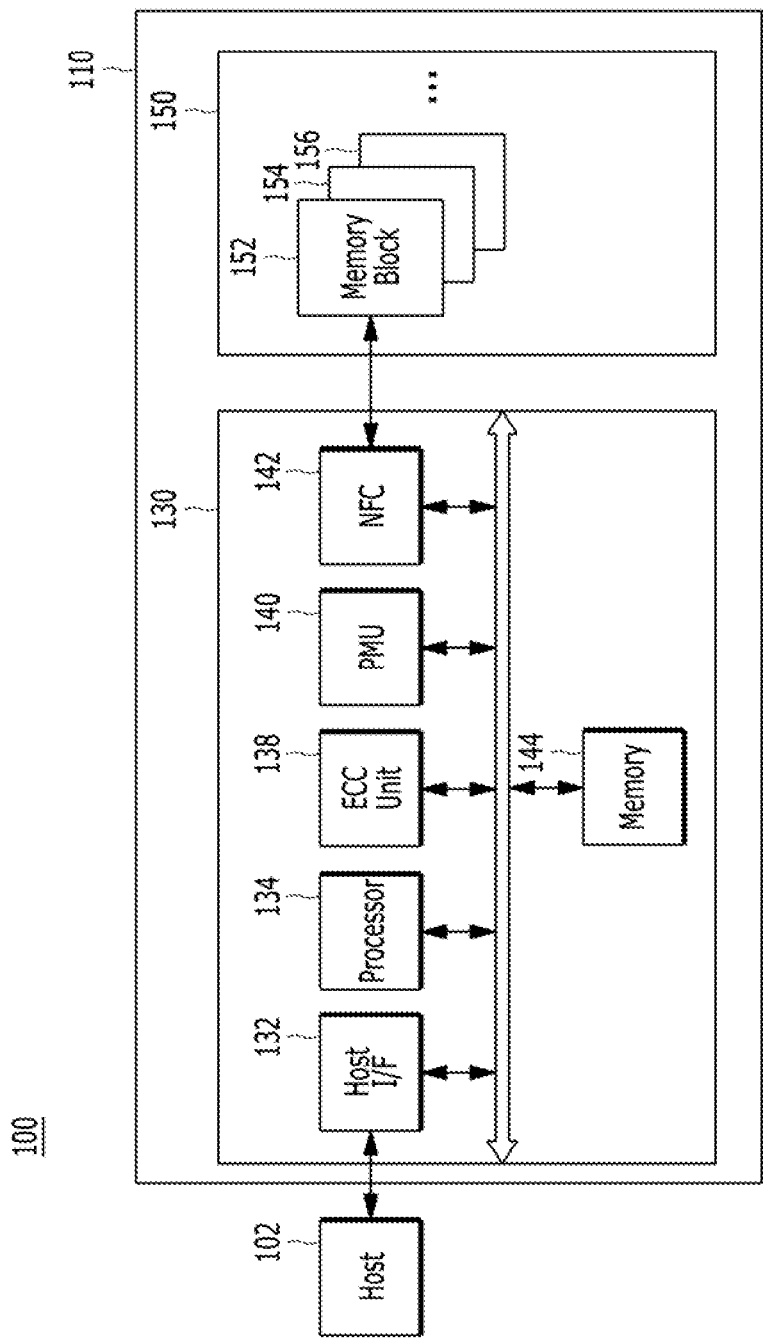
FIG. 1 is a diagram illustrating a data processing system including a memory system according to an embodiment of the present invention.

Various embodiments of the present invention will be described below in more detail with reference to the accompanying drawings. The present invention may, however, be embodied in different forms and should not be construed as being limited to the embodiments set forth herein. Rather, these embodiments are provided so that this disclosure is thorough and complete. Throughout the disclosure, like reference numerals refer to like parts throughout the various figures and embodiments of the present invention.

The drawings are not necessarily to scale and, in some instances, proportions may have been exaggerated in order to clearly illustrate features of the embodiments. When an element is referred to as being connected or coupled to another element, it should be understood that the former may be directly connected or coupled to the latter, or electrically connected or coupled to the latter via an intervening element therebetween. Furthermore, when it is described that one "comprises" (or "includes") or "has" some elements, it should be understood that it may comprise (or include) or have other elements as well as those elements if there is no specific limitation. The terms of singular form may include plural forms unless stated otherwise.

Referring now to FIG. 1, a data processing system 100 according to an embodiment of the present invention may include a host 102 and a memory system 110.

The host 102 may include any suitable electronic device. The host 102 may include, for example, a portable electronic device such as a mobile phone, an MP3 player and a laptop computer, or a non-portable electronic device such as a desktop computer, a game player, a TV, a projector and the like.

The memory system 110 may store data to be accessed by the host 102 in response to a request from the host 102. The memory system 110 may be used as a main memory system or an auxiliary memory system of the host 102. The memory system 110 may be implemented to be electrically coupled with the host 102, according to a protocol of a host interface. For example, the memory system 110 may be implemented with a solid state drive (SSD), a multimedia card (MMC), an embedded MMC (eMMC), a reduced size MMC (RS-MMC) and a micro-MMC, a secure digit SD) card, a mini-SD and a micro-SD, a universal serial bus (USB) storage device, a universal flash storage (UFS) device a compact flash (CF) card a smart media (SM) card, a memory stick, and the like.

The storage devices for the memory system 110 may be implemented with a volatile memory device such as a dynamic random access memory (DRAM), a static random access memory (SRAM) and the like. Alternatively, the storage devices for the memory system 110 may be implemented a nonvolatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), a resistive RAM (RRAM) and the like.

The memory system 110 may include a memory device 150 for storing data and a controller 130 for controlling storage of data in the memory device 150. The stored data in the memory device 150 may be accessed by the host 102.

The controller 130 and the memory device 150 may be integrated into a semiconductor device. For instance, the controller 130 and the memory device 150 may be integrated into a semiconductor device configured as a solid state drive (SSD). When the memory system 110 is used as a SSD, the operation speed of the host 102 that is electrically coupled with the memory system 110 may be substantially increased.

The controller 130 and the memory device 150 may be integrated into a semiconductor device configured as a memory card, such as a Personal Computer Memory Card International Association (PCMCIA) card, a compact flash (CF) card, a smart media (SM) card (SMC), a memory stick, a multimedia card (MMC), an RS-MMC and a micro-MMC, a secure digital (SD) card, a mini-SD, a micro-SD and an SDHC, a universal flash storage (UFS) device and the like.

The memory system 110 may configure a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID device, one of various component elements configuring a computing system and the like.

The memory device 150 may be a nonvolatile memory device, such as, for example, a flash memory capable of retaining stored data even when a power supply is interrupted Or turned off During a write operation, the memory device may store data provided from the host 102. During a read operation, the memory device 150 may provide stored data to the host 102. One or more memory devices 150 may be employed. The one or more devices 150 may be substantially identical. The one or more memory devices may be a combination of different type of memory devices. The memory device 150 may include a plurality of memory blocks, for example, memory blocks 152, 154 and 156. Each of the memory blocks 152, 154 and 156 may include a plurality of pages. Each of the pages may include a plurality of memory cells electrically coupled to a plurality of word lines (WL) The memory device 150 may have a three-dimensional (3D) stack structure, wherein the various components of the memory device are arranged in multiple layers. In an embodiment the memory device 150 may be a flash memory having a 3D stack structure. An example of a memory device 150 including a 3D stack structure will be described later in detail with reference to FIGS. 2 to 11.

The controller 130 may control overall operations of the memory device 150, such as read, write, program and erase operations. Generally, the controller 130 may control the memory device 150 in response to a request from the host 102. For example, the controller 130 may provide data read from the memory device 150, to the host 102 in response to a read request from the host 102. Or, also as an example, the controller may store data provided from the host 102 into the memory device 150 in response to a write request.

In an embodiment, the controller 130 may include a host interface unit 132, a processor 134, an error correction code (ECC) unit 138, a power management unit (PMU) 140, a NAND flash controller (NFC) 142, and a memory 144.

The host interface unit 132 may process commands and data provided from the host 102. The host interface unit 132 may communicate with the host 102 through at least one of various interface protocols such as a universal serial bus (USB), a multimedia card (MMC), a peripheral component interconnect-express (PCI-E), a serial attached SCSI (SAS), a serial advanced technology attachment (SATA), parallel advanced technology attachment (PATA), a small computer system interface (SCSI), an enhanced small disk interface (ESDI) integrated drive electronics (IDE) and the like. The host interface unit 132 may include any suitable circuits, systems or devices suitable for communicating with the host 102 and the other components of the controller 100 as may be needed.

The ECC unit 138 may detect and correct errors of the data read from the memory device 150 during a read operation. In an embodiment, if the number of error bits detected by the ECC unit 138 is greater than or equal to a threshold number of correctable error bits, the ECC unit 138 may not the correct error bits and output an error correction fail signal indicating failure in correcting the error bits.

The ECC unit 138 may perform an error correction operation based on any suitable error correction scheme. For example, the ECC unit 138 may perform an error correction operation based on a coded modulation scheme such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and the like. The ECC unit 138 may include any suitable circuits, systems or devices for the error correction operation.

The PMU 140 may provide and manage electric power for the controller 130. The PMU 140 may provide and manage electric power, for example, power for the various components of the controller 130 as may be needed. The PMU 140 may provide different voltage power to the various components of the controller as may be needed. The PMU 140 may provide same voltage power to the various components of the controller.

The NFC 142 may serve as a memory interface between the controller 130 and the memory device 150 to allow the controller 130 to control the memory device 150 in response to a request from the host 102. For example, the NFC 142 may generate control signals for the memory device 150 and process data under the control of the processor 134 when the memory device 150 is a flash memory, especially a NAND flash memory.

The memory 144 may serve as a working memory of the memory system 110 and the controller 130, and store data for driving the memory system 110 and the controller 130. For example, when the controller 130 controls the operations of the memory device 150, the memory 144 may store data used by the controller 130 and the memory device 150 for such operations as read, write, program and erase operations.

The memory 144 may be implemented with a volatile memory. For example, the memory 144 may be implemented with a static random access memory (SRAM) or a dynamic random access memory (DRAM). As described above, the memory 144 may store data used by the host 102 and the memory device 150 for read and/or write operations. The memory 144 may be or include a program memory, a data memory, a write buffer, a read buffer, a map buffer, and the like.

The processor 134 may control the general operations of the memory system 110. The processor 134 may control a write or read operation for the memory device 150, in response to a write or a read request from the host 102. The processor 134 may a drive firmware, also referred to as a flash translation layer (FTL), for controlling the general operations of the memory system 110. The processor 134 may be implemented with a microprocessor, a central processing unit (CPU) and the like.

A management unit (not shown) may be included in the processor 134 for performing a bad block management of the memory device 150. For example the management unit may find bad memory blocks included in the memory device 150, i.e., memory blocks which are in an unsatisfactory condition for further use, and perform a bad block management on the bad memory blocks. When a flash memory, for example, a NAND flash memory is employed as the memory device 150, a program failure may occur during the write operation, for example, during the program operation, due to inherent characteristics of a NAND logic function. During a bad block management, the data of the program-failed memory blocks or the bad memory blocks may be programmed into a new memory block. Also, the bad blocks due to the program fail may seriously deteriorate the utilization efficiency of the memory device 150 having a 3D stack structure and the reliability of the memory system 110, and thus reliable bad block management is required.

Figure 2:
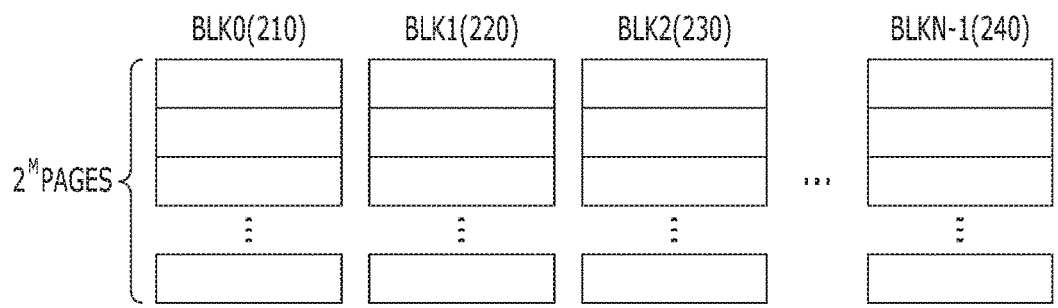
FIG. 2 is a diagram illustrating a memory device including a plurality of emery blocks, according to an embodiment of the present invention.

Referring to FIG. 2, the memory device 150 may include a plurality of memory blocks, for example, zeroth to $(N-1)^{th}$ blocks 210 to 240, where N is a positive integer. Each of the plurality of memory blocks 210 to 240 may include a plurality of pages for example, $2^M$ number of pages ($2^M$ PAGES), where M is a positive integer. Each of the plurality of pages may include a plurality of memory cells. A plurality of word lines may be electrically coupled to the memory cells. It is noted that any number of suitable blocks and pages per block may be employed.

The memory blocks may be single level cell (SLC) memory blocks and/or multi-level cell (MLC) memory blocks, according to the number of bits which may be stored or expressed in each memory cell. An SLC memory block may include a plurality of pages which are implemented with memory cells each capable of storing 1-bit data. The MLC memory block may include a plurality of pages which are implemented with memory cells each capable of storing multi-bit data, for example, two or more-bit data. An MLC memory block including a plurality of pages which are implemented with memory cells each capable of storing 3-bit data may also be referred to as a triple level cell (TLC) memory block.

Each of the plurality of memory blocks 210 to 240 may store data provided from the host device 102 during a write operation, and may provide stored data to the host 102 during a read operation.

Figure 3:
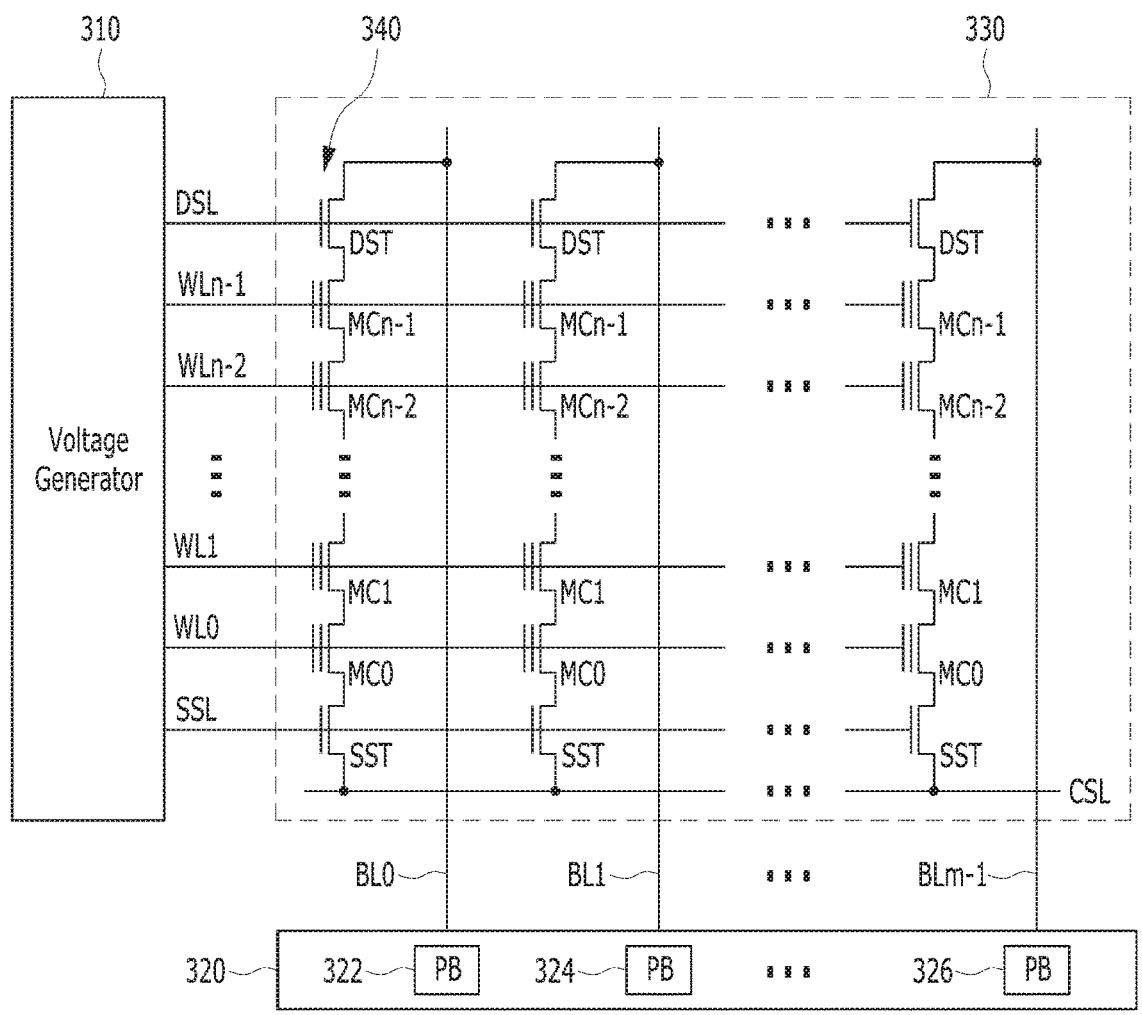
FIG. 3 is a circuit diagram illustrating a memory block in a memory device, according to an embodiment of the present invention.

FIG. 3 is a circuit diagram illustrating one of the plurality of memory blocks 152 to 156, according to an embodiment of the present invention.

Referring to FIG. 3, the memory block 152 of the memory device 150 may include a plurality of cell strings 340 electrically coupled to bit Fines BL0 to BLm-1, respectively. Each cell string 340 may include at least one drain select transistor DST and at least one source select transistor SST. A plurality of memory cells or a plurality of memory cell transistors MC0 to MCn-1 may be electrically coupled in series between the select transistors DST and SST The respective memory cells MC0 to MCn-1 may be consist of single level cells (SLC) each of which may store 1 bit of information, or by multi level cells (MLC) each of which may store data information of a plurality of bits. The memory cells may have any suitable architecture.

In FIG. 3, 'DSL' denotes a drain select line, 'SSL' denotes a source select line, and 'CSL' denotes a common source line.

FIG. 3 only shows, as an example, a memory block 152 configured by NAND flash memory cells. It is noted, however, that the memory block 152 of the memory device 150 according to the embodiment is not limited to NAND flash memory and may be realized by NOR flash memory, hybrid flash memory having at least two kinds of memory cells are combined, or one-NAND flash memory having a controller is built in a memory chip. The operational characteristics of a semiconductor device may be applied to not only a flash memory device in which a charge storing layer is configured by conductive floating gates but also a charge trap flash (CTF) in which a charge storing layer is configured by a dielectric layer.

It is also noted that the memory device 150 is not limited to a flash memory device only. For example, the memory device 150 may be a DRAM or a SRAM device.

A voltage generator 310 of the memory device 150 may generate word line voltages, for example, a program voltage, a read voltage and a pass voltage, to supply to respective word lines according to an operation mode. Further, the voltage generator 310 may generate voltages to be supplied to bulks, for example, well regions in which the memory cells are formed. The voltage generator 310 may perform a voltage generating operation under a control of a control circuit (not shown). The voltage generator 310 may generate a plurality of variable read voltages to generate a plurality of read data. The voltage generator 310 may select one of the memory blocks or sectors of a memory cell array, select one of the word lines of the selected memory block, and provide the word line voltages to the selected word line and unselected word lines, under the control of the control circuit.

A read/write circuit 320 of the memory device 150 may be controlled by the control circuit, and may serve as a sense amplifier or a write driver according to an operation mode. During a verification/normal read operation, the read/write circuit 320 may serve as a sense amplifier for reading data from the memory cell array. Also, during a program operation the read/write circuit 320 may serve as a write driver for driving bit lines according to data to be stored in the memory cell array. The read/write circuit 320 may receive data to be written in the memory cell array, from a buffer (not shown), during the program operation, and may drive the bit lines according to the inputted data. For example, the read/write circuit 320 may include a plurality of page buffers 322, 324 and 326 respectively corresponding to the columns (or bit lines) or pairs of the columns (or pairs of bit lines). Each of the page buffers 322, 324 and 326 may include a plurality of latches (not shown).

Figure 4:
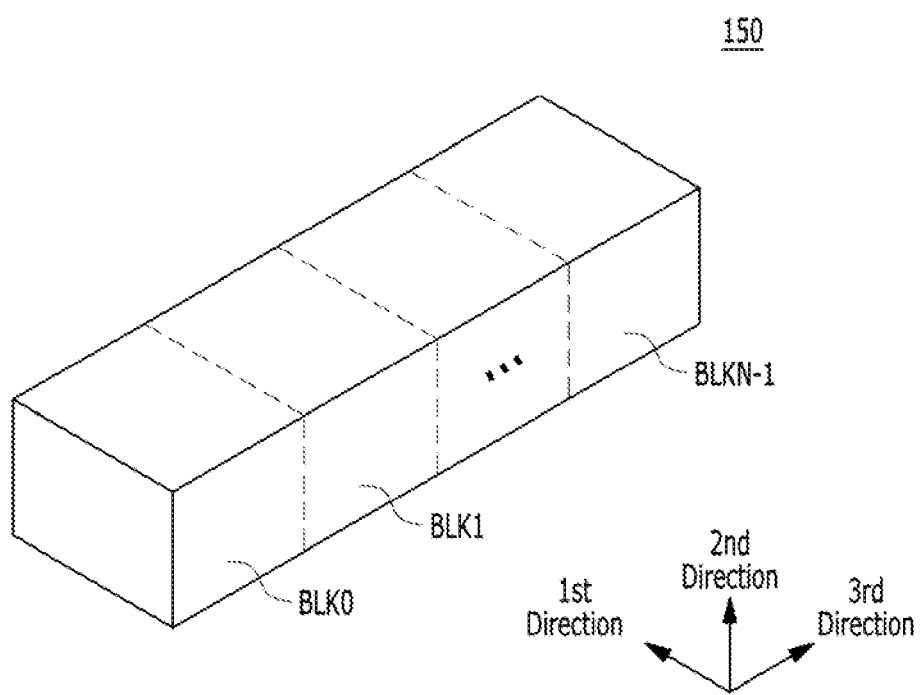
FIGS. 4 to 11 are diagrams schematically illustrating a memory device, according to various embodiments of the present invention.

FIG. 4 is a block diagram illustrating an example of the plurality of memory blocks 152 to 156 of the memory device 150 according to embodiment of the present invention.

Referring to FIG. 4, the memory device 150 may include a plurality of memory blocks BLK0 to BLKN-1. Each of the memory blocks BLK0 to BLKN-1 may be realized in a 3D structure or a vertical structure. Each memory block BLK0 to BLKN-1 may include a plurality of structures extending in first to third directions, for example, an x-axis direction, a y-axis direction and a z-axis direction.

The respective memory blocks BLK0 to BLKN-1 may include a plurality of NAND strings NS extending in the second direction. The plurality of NAND strings NS may be provided in the first direction and/or the third directions. Each NAND string NS may be electrically coupled to a bit line BL, at least one source select line SSL, at least one ground select line GSL, a plurality of word lines WL, at least one dummy word line DWL, and a common source line CSL. The respective memory blocks BLK0 to BLKN-1 may be electrically coupled to a plurality of bit lines BL, a plurality of source select lines SSL, a plurality of ground select lines GSL, a plurality of word lines WL, a plurality of dummy word lines DWL, and a plurality of common source lines CSL.

Figure 5:
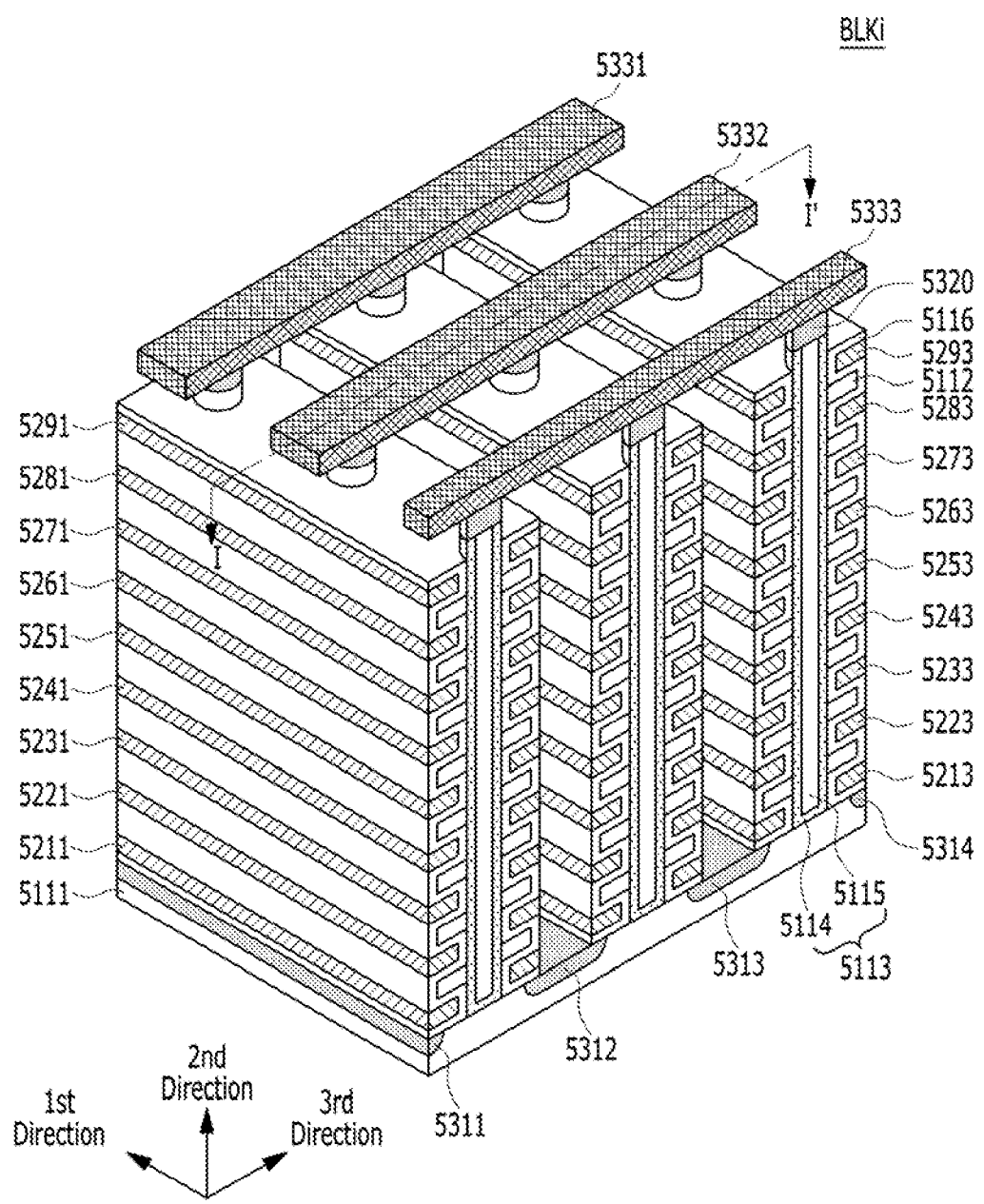
Figure 6:
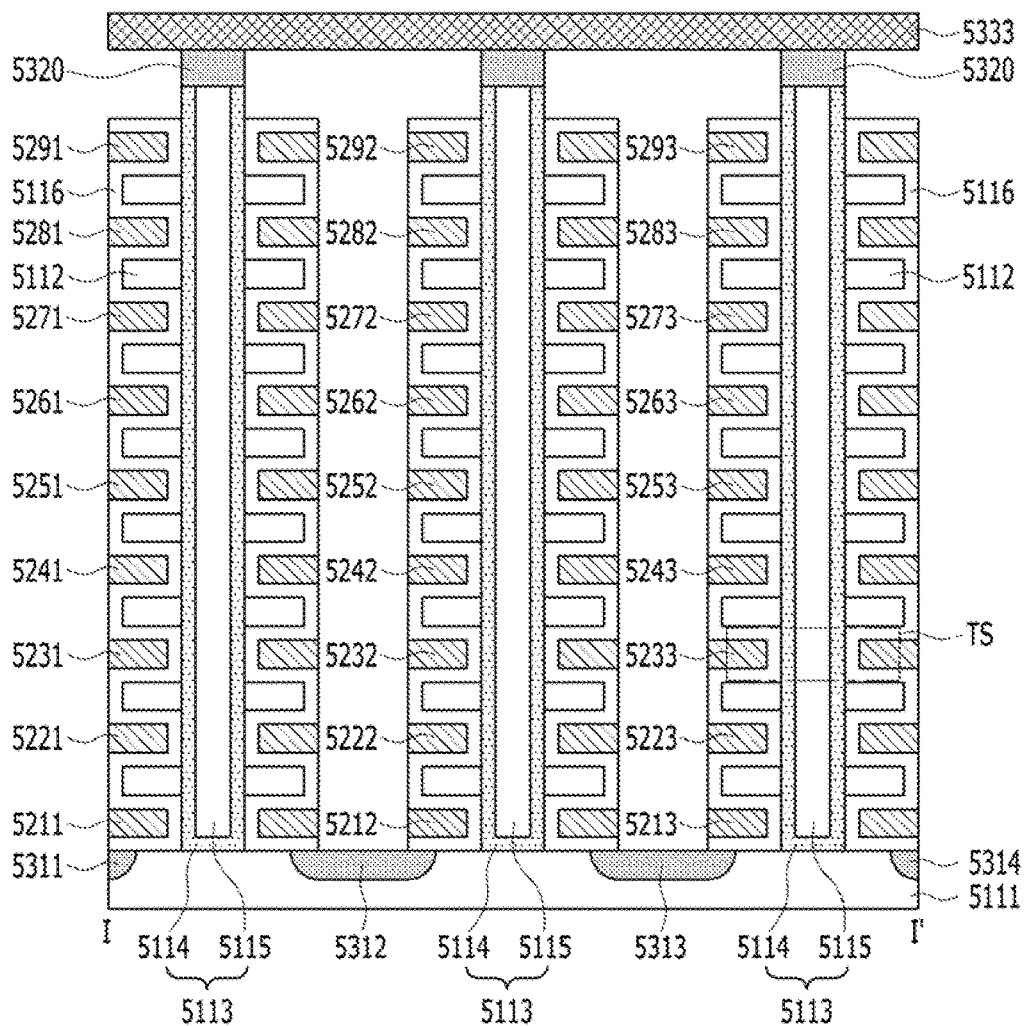

FIG. 5 is a perspective view of one BLKi of the memory blocks BLK0 to BLKN-1 shown in FIG. 4. FIG. 6 is a cross-sectional view taken along a line I-I' of the memory block BLKi shown in FIG. 5.

Referring to FIGS. 5 and 6, a memory block BLKi, among the plurality of memory blocks of the memory device 150, may include a structure extending in the first to third directions.

A substrate 5111 may be provided. The substrate 5111 may include a silicon material doped with a first type impurity. The substrate 5111 may include a silicon material doped with a p-type impurity. The substrate 5111 may be a p-type well, for example, a pocket p-well. The substrate 5111 may further include an n-type well surrounding the p-type well. Although, in the embodiment of the present invention, the substrate 5111 is exemplified as being the p-type silicon, however, it is to be noted that the substrate 5111 is not limited to the p-type silicon.

A plurality of doping regions 5311 to 5314 extending in the first direction may be provided over the substrate 5111. The plurality of doping regions 5311 to 5314 may contain a second type impurity that is different from that used in the substrate 5111. The plurality of doping regions 5311 to 5314 may be doped with an n-type impurity. Although, in the embodiment of the present invention, first to fourth doping regions 5311 to 5314 are exemplified as being the n-type, it is noted that they are not limited to the n-type.

In the region over the substrate 5111 between the first and second doping regions 5311 and 5312, a plurality of dielectric materials 5112 extending in the first direction may be sequentially provided in the second direction. The dielectric materials 5112 may be separated from the substrate 5111 by a preset distance in the second direction. The dielectric materials 5112 may be separated from one another by a preset distance in the second direction. The dielectric materials 5112 may include a dielectric material such as silicon oxide. It is noted that other suitable dielectric materials may also be used.

In the region over the substrate 5111 between the first and second doping regions 5311 and 5312, a plurality of pillars 5113 which are sequentially disposed in the first direction and pass through the dielectric materials 5112 in the second direction may be provided. The plurality of pillars 5113 may respectively pass through the dielectric materials 5112 and may be electrically coupled with the substrate 5111. Each pillar 5113 may be configured by a plurality of materials. A surface layer 5114 of each pillar 5113 may include a silicon material doped with the first type of impurity. The surface layer 5114 of each pillar 5113 may include a silicon material doped with the same type of impurity as the substrate 5111. Although, in the embodiment of the present invention, the surface layer 5114 of each pillar 5113 is exemplified as including p-type silicon, the surface layer 5114 of each pillar 5113 is not limited to the p-type silicon.

An inner layer 5115 of each pillar 5113 may be formed of a dielectric material. The inner layer 5115 of each pillar 5113 may be filled by a dielectric material such as silicon oxide.

In the region between the first and second doping regions 5311 and 5312, a dielectric layer 5116 may be provided along exposed surfaces of the dielectric materials 5112, the pillars 5113 and the substrate 5111. A thickness of the dielectric layer 5116 may be less than one half of the distance between the dielectric materials 5112. In other words, a region of a material other than the dielectric material 5112 and the dielectric layer 5116, may be provided between (i) the dielectric layer 5116 provided below the bottom surface of a first dielectric material of the dielectric materials 5112 and (ii) the dielectric layer 5116 provided over the top surface of a second dielectric material of the dielectric materials 5112. The dielectric materials 5112 may lie below the first dielectric material.

In the region between the first and second doping regions 5311 and 5312, conductive materials 5211 to 5291 may be provided over an exposed surface of the dielectric layer 5116. The conductive material 5211 extending in the first direction may be provided between the dielectric material 5112 adjacent to the substrate 5111 and the substrate 5111. In particular, the conductive material 5211 extending in the first direction may be provided between (i) the dielectric layer 5116 disposed over the substrate 5111 and (ii) the dielectric layer 5116 disposed below the bottom surface of the dielectric material 5112 adjacent to the substrate 5111.

The conductive material extending in the first direction may be provided between (i) the dielectric layer 5116 disposed over the top surface of one of the dielectric materials 5112 and (ii) the dielectric layer 5116 disposed below the bottom surface of another dielectric material of the dielectric materials 5112, which is disposed over the one dielectric material 5112. The conductive materials 5221 to 5281 extending in the first direction may be provided between the dielectric materials 5112. The top conductive material 5291 extending in the first direction may be provided over the uppermost dielectric material 5112. The conductive materials 5211 to 5291 extending in the first direction may be made of a metallic material. The conductive materials 5211 to 5291 extending in the first direction may be made of a conductive material such as polysilicon.

In the region between the second doping region 5312 and a third doping region 5313, the same structures as the structures between the first and second doping regions 5311 and 5312 may be provided. For example, in the region between the second and third doping regions 5312 and 5313, the plurality of dielectric materials 5112 extending in the first direction, the plurality of pillars 5113 which are sequentially arranged in the first direction and pass through the plurality of dielectric materials 5112 in the second direction, the dielectric layer 5116 which is provided over the exposed surfaces of the plurality of dielectric materials 5112 and the plurality of pillars 5113 and the plurality of conductive materials 5212 to 5292 extending in the first direction may be provided.

In the region between the third doping region 5313 and a fourth doping region 5314, the same structures as between the first and second doping regions 5311 and 5312 may be provided. For example, in the region between the third and fourth doping regions 5313 and 5314, the plurality of dielectric materials 5112 extending in the first direction, the plurality of pillars 5113 which are sequentially arranged in the first direction and pass through the plurality of dielectric materials 5112 in the second direction, the dielectric layer 5116 which is provided over the exposed surfaces of the plurality of dielectric materials 5112 and the plurality of pillars 5113, and the plurality of conductive materials 5213 to 5293 extending in the first direction may be provided.

Drains 5320 may be respectively provided over the plurality of pillars 5113. The drains 5320 may be made of silicon materials doped to with second type impurities. The drains 5320 may be made of silicon materials doped with n-type impurities. Although, for the sake of convenience of explanation, the drains 5320 is exemplified as including n-type silicon, it is noted that the drains 5320 are not limited to the n-type silicon. The width of each drain 5320 may be larger than the width of each corresponding pillar 5113. For example, each drain 5320 may be provided in the shape of a pad over the top surface of each corresponding pillar 5113.

Conductive materials 5331 to 5333 extending in the third direction may be provided over the drains 5320. Each of the conductive materials 5331 to 5333 may be extendedly disposed over the drains 5320 serially arranged in the third direction with a preset separation distance to each other in the first direction. The respective conductive materials 5331 to 5333 may be electrically coupled with the drains 5320 there below. For example, the drains 5320 and the conductive materials 5331 to 5333 extending in the third direction may be electrically coupled with through contact plugs. The conductive materials 5331 to 5333 may be made of a metallic material. The conductive materials 5331 to 5333 may be made of a conductive material such as polysilicon.

In FIGS. 5 and 6, the respective pillars 5113 may form strings together with the dielectric layer 5116 and the conductive materials 5211 to 5291, 5212 to 5292 and 5213 to 5293 extending in the first direction. The respective pillars 5113 may form NAND strings NS together with the dielectric layer 5116 and the conductive materials 5211 to 5291, 5212 to 5292 and 5213 to 5293 extending in the first direction. Each NAND string NS may include a plurality of transistor structures TS.

Figure 7:
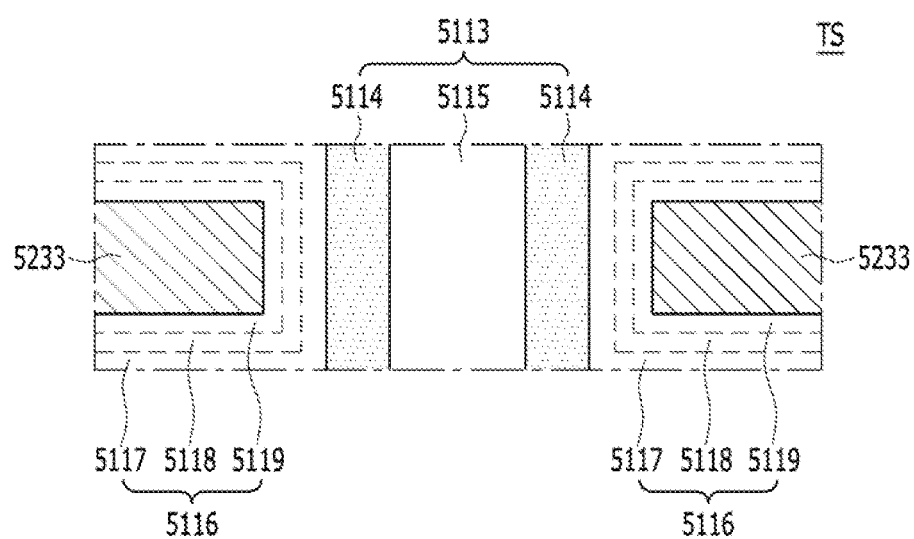

Referring now to FIG. 7, in the transistor structure TS shown in FIG. 6, the dielectric layer 5116 may include first to third sub dielectric layers 5117, 5118 and 5119.

The surface layer 5114 of p-type silicon in each of the pillars 5113 may serve as a body. The first sub dielectric layer 5117 adjacent to the pillar 5113 may serve as a tunneling dielectric layer, and may include a thermal oxidation layer.

The second sub dielectric layer 5118 may serve as a charge storing layer. The second sub dielectric layer 5118 may serve as a charge capturing layer, and may include a nitride layer or a metal oxide layer such as an aluminum oxide layer, a hafnium oxide layer, or the like.

The third sub dielectric layer 5119 adjacent to the conductive material 5233 may serve as a blocking dielectric layer. The third sub dielectric layer 5119 adjacent to the conductive material 5233 extending in the first direction may be formed as a single layer or multiple layers. The third sub dielectric layer 5119 may be a high-k dielectric layer such as an aluminum oxide layer, a hafnium oxide layer, or the like, which has a dielectric constant greater than the first and second sub dielectric layers 5117 and 5118.

The conductive material 5233 may serve as a gate or a control gate. For example, the gate or the control gate 5233, the blocking dielectric layer 5119, the charge storing layer 5118, the tunneling dielectric layer 5117 and the body 5114 may form a transistor or a memory cell transistor structure. For example, the first to third sub dielectric layers 5117 to 5119 may form an oxide-nitride-oxide (ONO) structure. In the embodiment, for the sake of convenience of explanation, the surface layer 5114 of p-type silicon in each of the pillars 5113 will be referred to as a body in the second direction.

The memory block BLKi may include the plurality of pillars 5113. For example, the memory block BLKi may include the plurality of NAND strings NS. In detail, the memory block BLKi may include the plurality of NAND strings NS extending in the second direction or a direction perpendicular to the substrate 5111.

Each NAND string NS may include the plurality of transistor structures TS which are disposed in the second direction. At least one of the plurality of transistor structures TS of each NAND string NS may serve as a string source transistor SST. At least one of the plurality of transistor structures TS of each NAND string NS may serve as a ground select transistor GST.

The gates or control gates may correspond to the conductive materials 5211 to 5291, 5212 to 5292 and 5213 to 5293 extending in the first direction. For example, the gates or the control gates may extend in the first direction and form word lines and at least two select to lines including at least one source select line SSL and at least one ground select line GSL.

The conductive materials 5331 to 5333 extending in the third direction may be electrically coupled to one end of the NAND strings NS. The conductive materials 5331 to 5333 extending in the third direction may serve as bit lines L. For example, in one memory block BLKi, the plurality of NAND strings NS may be electrically coupled to one bit line BL.

The second type doping regions 5311 to 5314 extending in the first direction may be provided to the other ends of the NAND strings NS. The second type doping regions 5311 to 5314 extending in the first direction may serve as common source lines CSL.

For example, the memory block BLKi may include a plurality of NAND strings NS extending in a direction perpendicular to the substrate 5111, e.g., the second direction, and may serve as a NAND flash memory block, for example, of a charge capturing type memory, in which the plurality of NAND strings NS are electrically coupled to one-bit line BL.

Although it is illustrated in FIGS. 5 to 7 that the conductive materials 5211 to 5291, 5212 to 5292 and 5213 to 5293 extending in the first direction are provided by nine (9) layers, it is noted that the conductive materials 5211 to 5291, 5212 to 5292 and 5213 to 5293 extending in the first direction are not limited thereto. For example, conductive materials extending in the first direction may be provided in eight (8) layers, sixteen (16) layers or any multiple layers. For example, in one NAND string NS, the number of transistors may be 8, 16 or more.

Although it is illustrated in FIGS. 5 to 7 that three (3) NAND strings NS are electrically coupled to one-bit line BL, it is noted that the embodiment is not limited thereto. In the memory block BLKi, m NAND strings NS may be electrically coupled to one-bit line BL, m being a positive integer. The number of conductive materials 5211 to 5291, 5212 to 5292 and 5213 to 5293 extending in the first direction and the number of common source lines 5311 to 5314 may vary with the number of NAND strings NS which are electrically coupled to one-bit line BL.

Further, although it is illustrated in FIGS. 5 to 7 that three (3) NAND strings NS are electrically coupled to one conductive material extending in the first direction, it is noted that the embodiment is not limited thereto. For example, n NAND strings NS may be electrically coupled to one conductive material extending in the first direction, n being a positive integer. The number of bit lines 5331 to 5333 may vary with the number of NAND strings NS which are electrically coupled to one conductive material extending in the first direction.

Figure 8:
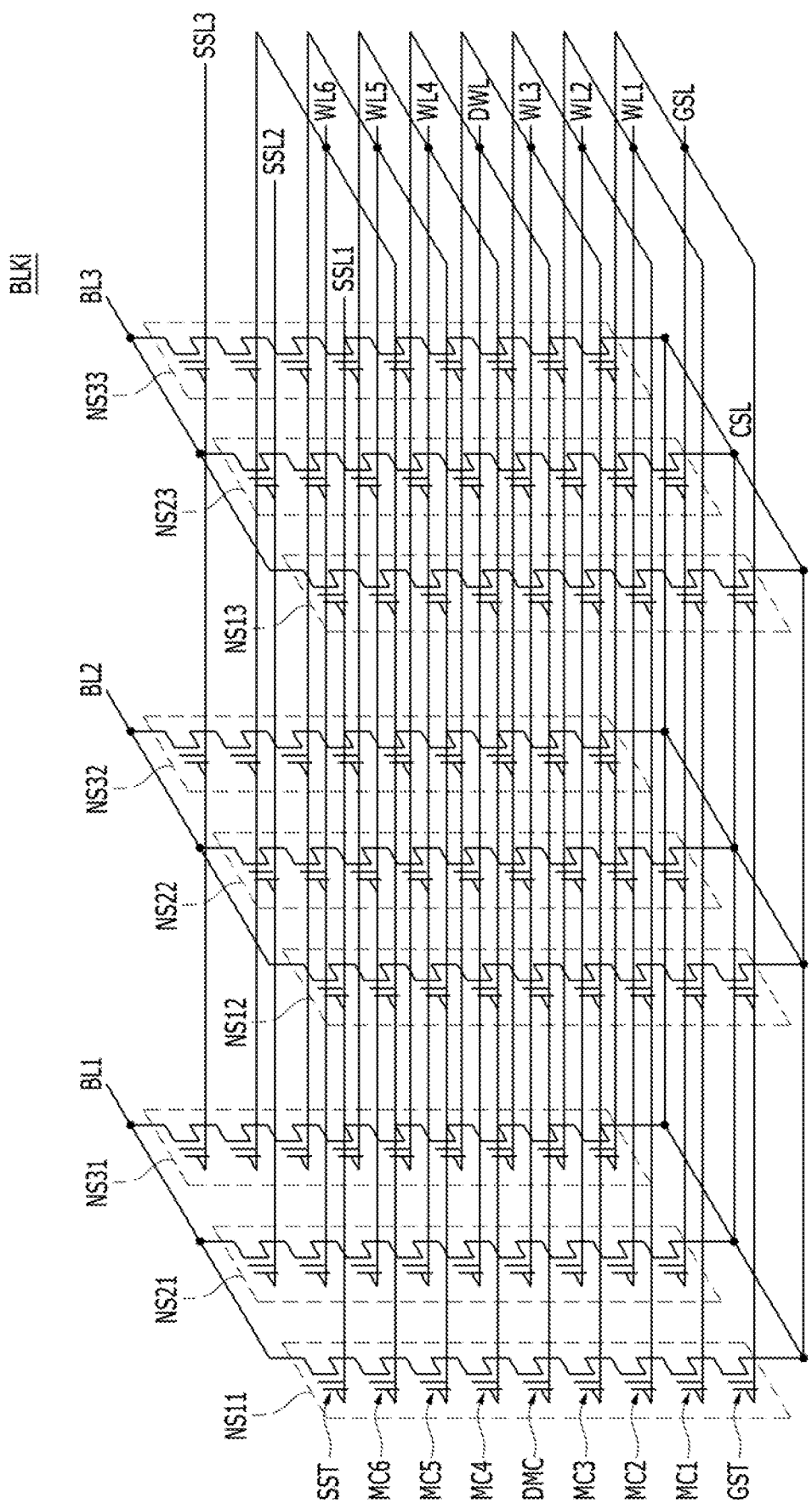

Referring to FIG. 8, in a block BLKi having the first structure, NAND strings NS11 to NS31 may be provided between a first bit line BL1 and a common source line CSL. The first bit line BL1 may correspond to the conductive material 5331 of FIGS. 5 and 6, extending in the third direction. NAND strings NS12 to NS32 may be provided between a second bit line BL2 and the common source line CSL. The second bit line BL2 may correspond to the conductive material 5332 of FIGS. 5 and 6, extending in the third direction. NAND strings NS13 to NS33 may be provided between a third bit line BL3 and the common source line CSL. The third bit line BL3 may correspond to the conductive material 5333 of FIGS. 5 and 6, extending in the third direction.

A source select transistor SST of each NAND string NS may be electrically coupled to a corresponding bit line BL. A ground select transistor GST of each NAND string NS may be electrically coupled to the common source line CSL. Memory cells MC1 to MC6 may be provided between the source select transistor SST and the ground select transistor GST of each NAND string NS.

In this example, the NAND strings NS may be defined by units of rows and columns. The NAND strings NS which are electrically coupled to one-bit line may form one column. The NAND strings NS11 to NS31 which are electrically coupled to the first bit line BL1 may correspond to a first column. The NAND strings NS12 to NS32 which are electrically coupled to the second bit line BL2 may correspond to a second column. The NAND strings NS13 to NS33 which are electrically coupled to the third bit line BL3 may correspond to a third column. The NAND strings NS which are electrically coupled to one source select line SSL may form one row. The NAND strings NS11 to NS13 which are electrically coupled to a first source select line SSL1 may form a first row. The NAND strings NS21 to NS23 which are electrically coupled to a second source select line SSL2 may form a second row. The NAND strings NS31 to NS33 which are electrically coupled to a third source select line SSL3 may form a third row.

In each NAND string NS, a height may be defined. In each NAND string NS, the height of the memory cell MC1 adjacent to the ground select transistor GST may have, for example, a value '1'. In each NAND string NS, the height of a memory cell may increase as the memory cell gets closer to the source select transistor SST when measured from the substrate 5111. In each NAND string NS, the height of a memory cell MC6 adjacent to the source select transistor SST may have, for example, a value '7'.

The source select transistors SST of the NAND strings NS arranged in the same row may share the source select line SSL. The source select transistors SST of the NAND strings NS arranged in different rows may be respectively electrically coupled to the different source select lines SSL1, SSL2 and SSL3.

The memory cells at the same height in the NAND strings NS in the same row may share a word line WL. For example, at the same height, the word lines WL electrically coupled to the memory cells MC of the NAND strings NS in different rows may be electrically coupled with each other. Dummy memory cells DMC at the same height in the NAND strings NS of the same row may share a dummy word line DWL. For example, at the same height or level, the dummy word lines DWL electrically coupled to the dummy memory cells DMC of the NAND strings NS in different rows may be electrically coupled with each other.

The word lines WL or the dummy word lines DWL located at the same level or height or layer may be electrically coupled with each other for each of layers where the conductive materials 5211 to 5291, 5212 to 5292 and 5213 to 5293 extending in the first direction may be provided. The conductive materials 5211 to 5291, 5212 to 5292 and 5213 to 5293 extending in the first direction may be electrically coupled in common to upper layers through contacts. In other words, the ground select transistors GST of the NAND strings NS in the same row may share the ground select line GSL. Further, the ground select transistors GST of the NAND strings NS in different rows may share the ground select line GSL. For example, the NAND strings NS11 to NS13, NS21 to NS23 and NS31 to NS33 may be electrically coupled in common to the ground select line GSL.

The common source line CSL may be electrically coupled in common to the NAND strings NS. Over the active regions over the substrate 5111, the first to fourth doping regions 5311 to 5314 may be electrically coupled. The first to fourth doping regions 5311 to 5314 may be electrically coupled in common to an upper layer through contacts.

For example, as shown in FIG. 8, the word lines WL of the same height or level may be electrically coupled to each other. Accordingly, when a word line WL at a certain height is selected, all NAND strings NS which are electrically coupled to the selected word line WL may be selected. The NAND strings NS in different rows may be electrically coupled to different source select lines SSL. Accordingly, among the NAND strings NS electrically coupled to the same word line WL, by selecting one of the source select lines SSL1 to SSL3, the NAND strings NS in the unselected rows may be electrically isolated from the bit lines BL1 to BL3. In other words, by selecting one of the source select lines SSL1 to SSL3, the NAND strings NS arranged in the same row as the selected source line may be selected. Furthermore, by selecting one of the bit lines BL1 to BL3, the NAND strings NS arranged in the same column as the selected bit line may be selected. Accordingly, only the NAND strings NS arranged in the same row as the selected source line and the same column as the selected bit line may be selected.

In each NAND string NS, a dummy memory cell DMC may be provided. In FIG. 8, for example, the dummy memory cell DMC may be provided between a third memory cell MC3 and a fourth memory cell MC4 in each NAND string NS. For example, first to third memory cells MC1 to MC3 may be provided between the dummy memory cell DMC and the ground select transistor GST. Fourth to sixth memory cells MC4 to MC6 may be provided between the dummy memory cell DMC and the source select transistor SST. The memory cells MC of each NAND string NS may be divided into two (2) memory cell groups by the dummy memory cell DMC. In the divided memory cell groups, to memory cells, for example, MC1 to MC3, adjacent to the ground select transistor GST may be referred to as a lower memory cell group, and remaining memory cells, for example, MC4 to MC6, adjacent to the string select transistor SST may be referred to as an upper memory cell group.

Figure 9:
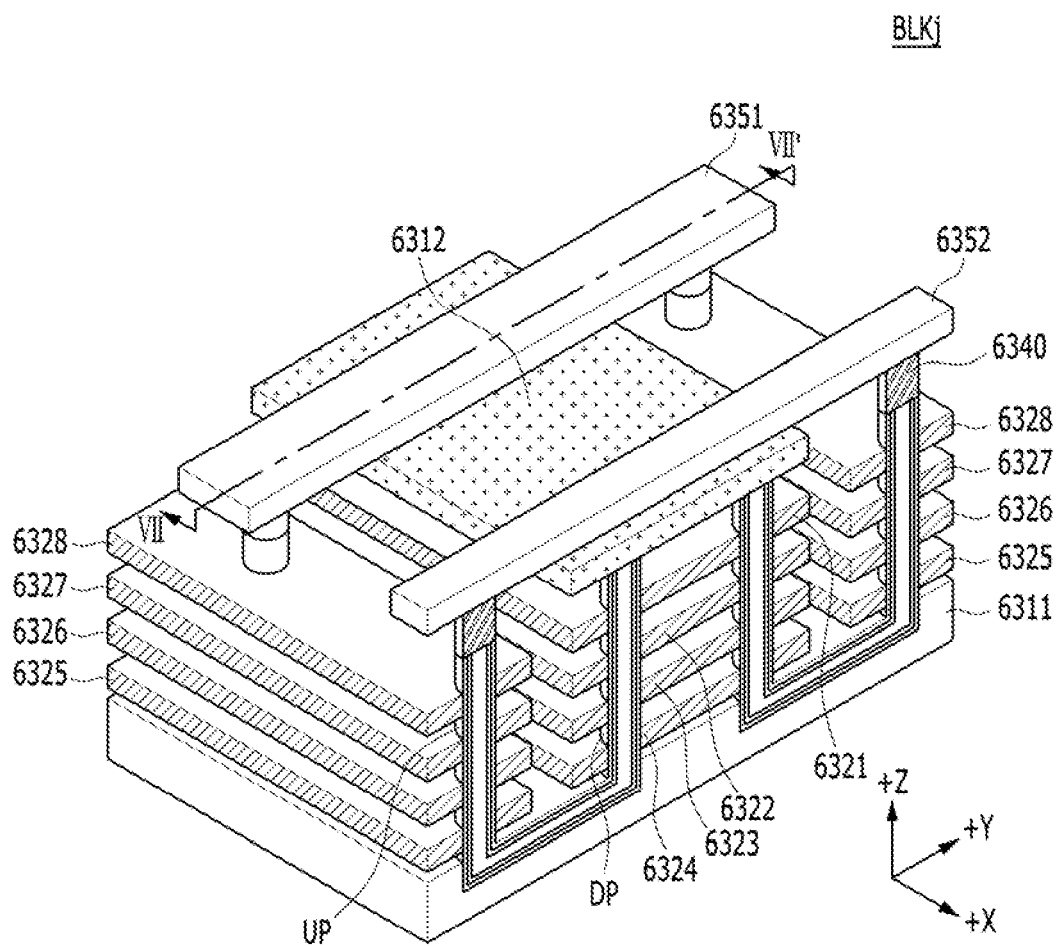
Figure 10:
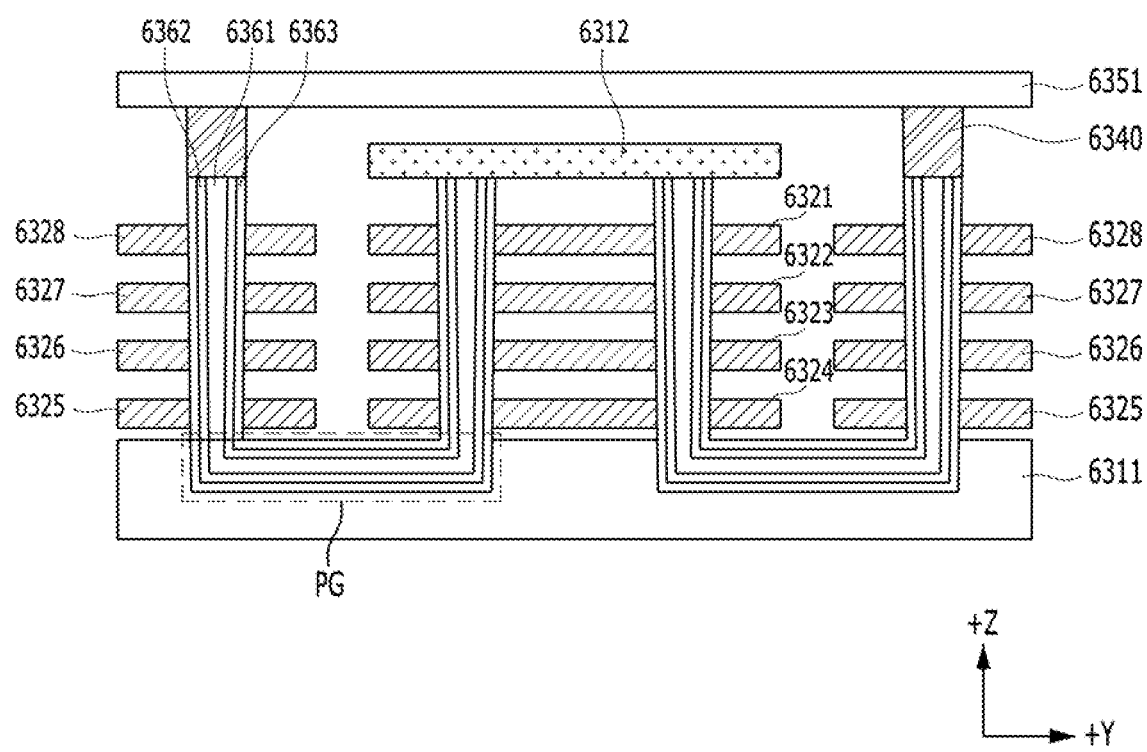
Figure 11:
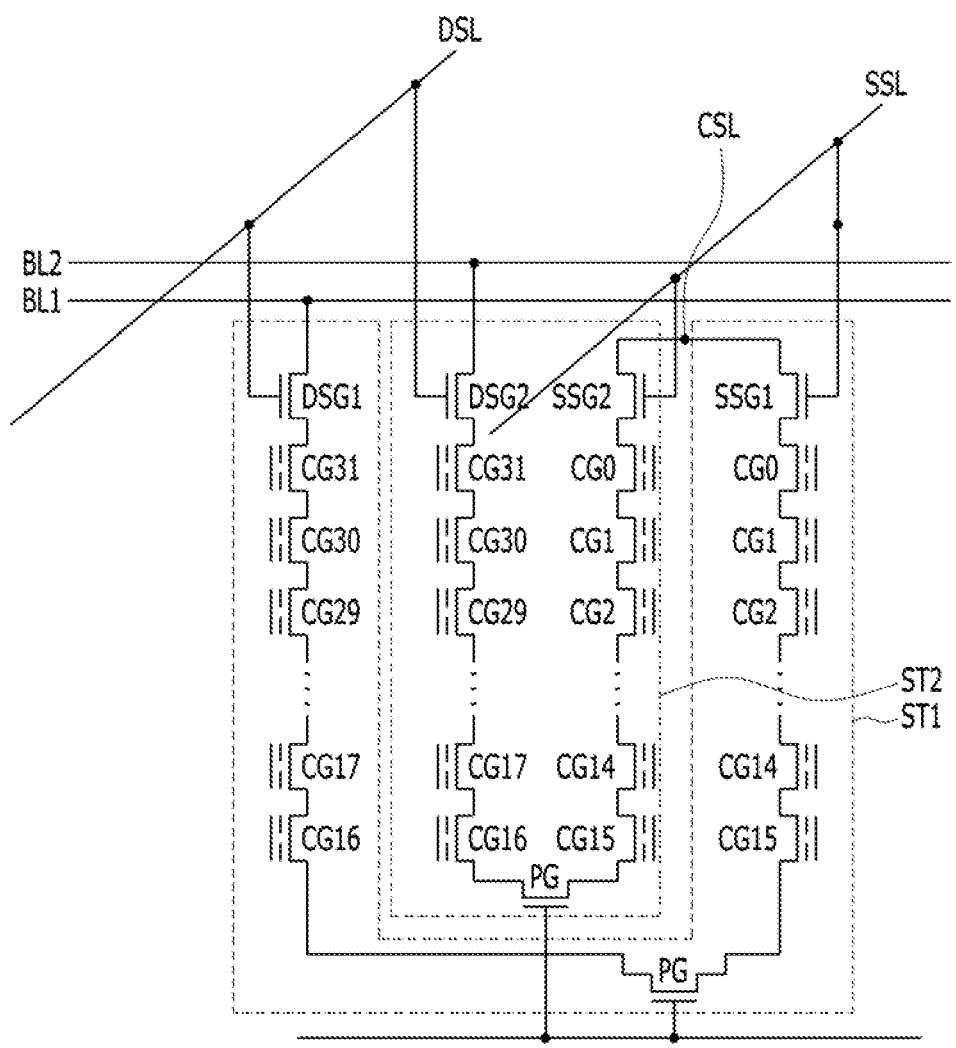

Referring now to FIGS. 9 to 11, a memory device in a memory system employing a three-dimensional (3D) nonvolatile memory device is provided, according to an embodiment of the invention.

FIG. 9 is a perspective view schematically illustrating the memory device implemented with a three-dimensional (3D) nonvolatile memory device, which is different from the first structure described above with reference to FIGS. 5 to 8, and showing a memory block BLKj of the plurality of memory blocks of FIG. 4. FIG. 10 is a cross-sectional view illustrating the memory block BLKj taken along the line VII-VII' of FIG. 9.

The memory block BLKj among the plurality of memory blocks of the memory device 150 of FIG. 1 may include structures extending in the first to third directions.

A substrate 6311 may be provided. For example, the substrate 6311 may include a silicon material doped with a first type impurity. For example, the substrate 6311 may include a silicon material doped with a p-type impurity. The substrate 6311 may be a p-type well, for example, a pocket p-well. The substrate 6311 may further include an n-type well which surrounds the p-type well. Although, in the described embodiment, the substrate 6311 is exemplified as being the p-type silicon, it is noted that the substrate 6311 is not limited to the p-type silicon.

First to fourth conductive materials 6321 to 6324 extending in an x-axis direction and a y-axis direction are provided over the substrate 6311. The first to fourth conductive materials 6321 to 6324 may be separated by a preset distance in the z-axis direction.

Fifth to eighth conductive materials 6325 to 6328 extending in the x-axis direction and the y-axis direction may be provided over the substrate 6311. The fifth to eighth conductive materials 6325 to 6328 may be separated by the preset distance in the z-axis direction. The fifth to eighth conductive materials 6325 to 6328 may be separated from the first to fourth conductive materials 6321 to 6324 in the y-axis direction.

A plurality of lower pillars DP passing through the first to fourth conductive materials 6321 to 6324 may be provided. Each lower pillar DP may extend in the z-axis direction. Also, a plurality of upper pillars UP passing through the fifth to eighth conductive materials 6325 to 6325 may be provided. Each upper pillar UP may extend in the z-axis direction.

Each of the lower pillars DP and the upper pillars UP may include an internal material 6361, an intermediate layer 6362, and a surface layer 6363. The intermediate layer 6362 may serve as a channel of the cell transistor. The surface layer 6363 may include a blocking dielectric layer, a charge storing layer and/or a tunneling dielectric layer.

The lower and the upper pillars DP and UP may be electrically coupled with each other through a pipe gate PG. The pipe gate PG may be disposed in the substrate 6311. For example, the pipe gate PG may include the same material as the lower pillar DP and the upper pillar UP.

A doping material 6312 of a second type extending in the x-axis direction and the y-axis direction may be provided over the lower pillars DP. For example, the doping material 6312 of the second type may include an n-type silicon material. The doping material 6312 of the second type may serve as a common source line CSL.

Drains 6340 may be provided over the upper pillars UP. The drains 6340 may include an n-type silicon material. First and second upper conductive materials 6351 and 6352 extending in the y-axis direction may be provided over the drains 6340.

The first and second upper conductive materials 6351 and 6352 may be spaced apart along the x-axis direction. The first and second upper conductive materials 6351 and 6352 may be formed of a metal. The first and second upper conductive materials 6351 and 6352 and the drains 6340 may be electrically coupled with each other through contact plugs. The first and second upper conductive materials 6351 and 6352 may serve as first and second bit lines BL1 and BL2, respectively.

The first conductive material 6321 may serve as a source select line SSL. The second conductive material 6322 may serve as a first dummy word line DWL1. The third and fourth conductive materials 6323 and 6324 serve as first and second main word lines MWL1 and MWL2, respectively. The fifth and sixth conductive materials 6325 and 6326 serve as third and fourth main word lines MWL3 and MWL4, respectively. The seventh conductive material 6327 may serve as a second dummy word line DWL2. The eighth conductive material 6328 may serve as a drain select line DSL.

The lower pillar DP and the first to fourth conductive materials 6321 to 6324 adjacent to the lower pillar DP may form a lower string. The upper pillar UP and the fifth to eighth conductive materials 6325 to 6328 adjacent to the upper pillar UP may form an upper string. The lower and the upper strings may be electrically coupled with each other through the pipe gate PG. One end of the lower string may be electrically coupled to the doping material 6312 of the second type which serves as the common source line CSL. One end of the upper string may be electrically coupled to a corresponding bit line through the drain 6340. One lower string and one upper string may form one cell string which is electrically coupled between the doping material 6312 serving as the common source line CSL and a corresponding one of the upper conductive material layers 6351 and 6352 serving as the bit line BL.

For example, the lower string may include a source select transistor SST, the first dummy memory cell DMC1, and the first and second main memory cells MMC1 and MMC2. The upper string may include the third and fourth main memory cells MMC3 and MMC4, the second dummy memory cell DMC2, and a drain select transistor DST.

In FIGS. 9 and 10, the upper string and the lower string may form a NAND string NS. The NAND string NS may include a plurality of transistor structures TS. Since the transistor structure included in the NAND string NS in FIGS. 9 and 10 is described above in detail with reference to FIG. 7, a detailed description thereof will be omitted herein.

FIG. 11 is a circuit, diagram illustrating the equivalent circuit of the memory block BLKj having the second structure as described above with reference to FIGS. 9 and 10. For the sake of convenience, only a first string ST1 and a second string ST2 are shown, forming a pair in the memory block BLKj in the second structure.

Referring to FIG. 11, in the memory block BLKj having the second structure among the plurality of blocks of the memory device 150, a plurality of cell strings, each of which is implemented with one upper string and one lower string electrically coupled through the pipe gate PG as described above with reference to FIGS. 9 and 10, may be provided in such a way as to define a plurality of pairs.

Namely, in memory block BLKj having the second structure, memory cells CG0 to CG31 stacked along a first channel CH1 (not shown), for example, at least one source select gate SSG1 and at least one drain select gate DSG1 may form a first string ST1, and memory cells CG0 to CG31 stacked along a second channel CH2 (not shown), for example, at least one source select gate SSG2 and at least one drain select gate DSG2 may form a second string ST2.

The first and the second strings ST1, ST2 may be electrically coupled to the same drain select line DSL and the same source select line SSL. The first string ST1 may be electrically coupled to a first bit line BL1. The second string ST2 may be electrically coupled to a second bit line BL2.

Although FIG. 11 shows the first string ST1 and the second string ST2 are electrically coupled to the same drain select line DSL and the same source select line SSL, it may be envisaged that the first string ST1 and the second string ST2 may be electrically coupled to the same source select line SSL and the same bit line BL, the first string ST1 may be electrically coupled to a first drain select line DSL1 and the second string ST2 may be electrically coupled to a second drain select line DSL2. Further it may be envisaged that the first string ST1 and the second string ST2 may be electrically coupled to the same drain select line DSL and the same bit line BL, the first string ST1 may be electrically coupled to a first source select line SSL1 and the second string ST2 may be electrically coupled a second source select line SSL2.

Hereinafter, a data processing operation for a memory device in a memory system will be described with reference to FIGS. 12 and 13, according to an embodiment of the present invention. In particular, a data processing operation when data is programmed into the memory device will be described in more detail below, as an example.

For example, in the memory system of FIG. 1, a data processing operation may include command data corresponding to a command received from the host 102. The command data may be, for example, write data corresponding to a write command received from the host 102. The command data may be stored in the buffer/cache included in the memory 144 of the controller 130. The data processing operation may further include writing the data stored in the buffer/cache in a plurality of memory blocks included in the memory device 150. Stated otherwise, the data stored in the buffer/cache may be programmed into a plurality of memory blocks of the memory device 150. The data programmed into the memory device 150 may be updated and re-programmed into the memory device 150 multiple times as may be needed.

Figure 12:
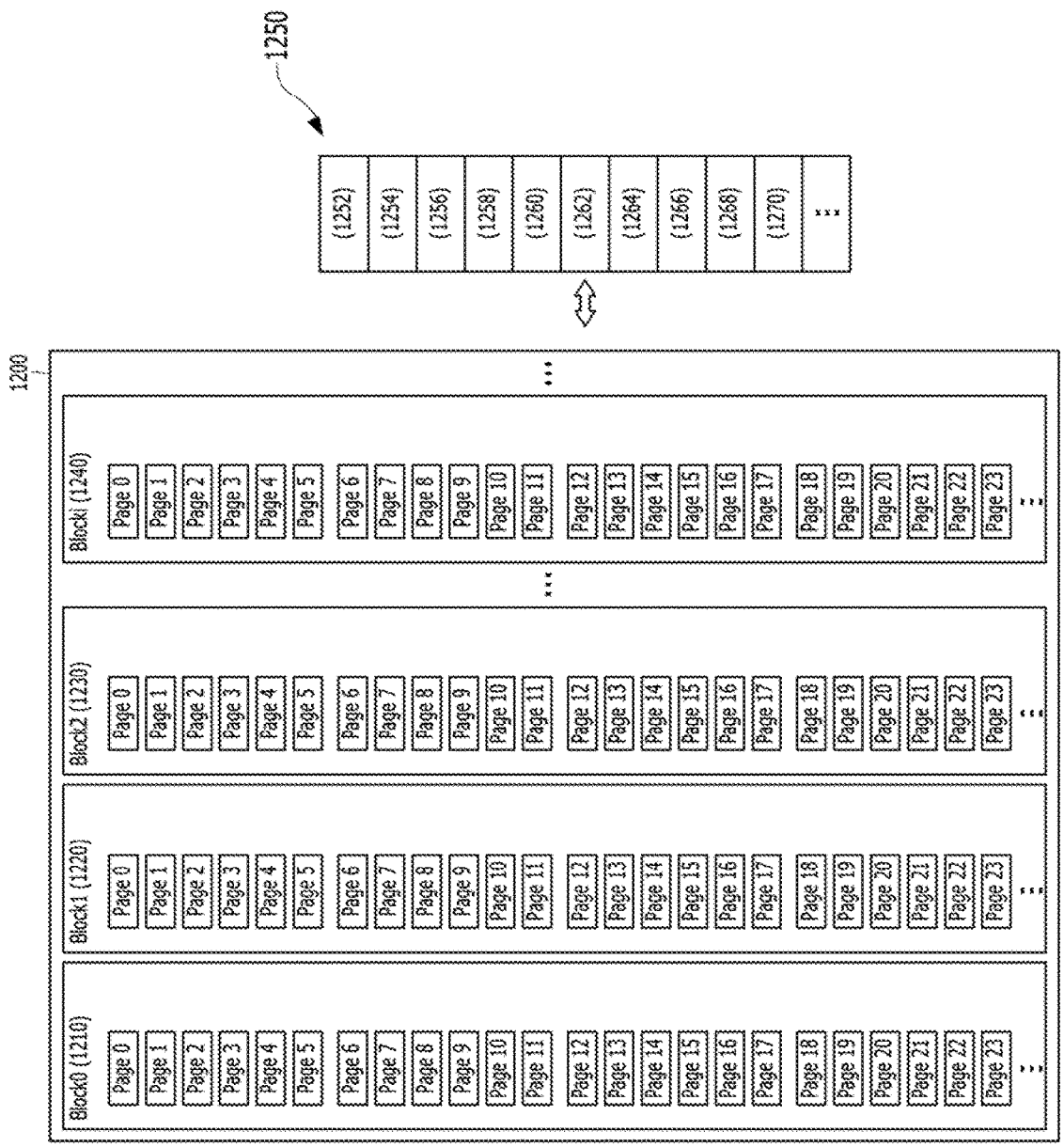
FIGS. 12 and 13 are diagrams schematically illustrating a data processing operation, according to an embodiment of the present invention.

In the embodiment of FIG. 12, write data corresponding to a write command received from the host 102 may be programmed and stored in one or more of the memory blocks 152, 154 and 156 of the memory device 150 as described above. In particular, each of the memory blocks may include a plurality of pages, and the write data may be programmed and stored in one or more pages of one or more memory blocks corresponding to the write command. When a write command is received from the host 102 with respect to write data to be programmed into one or more pages of a memory block, the write data may be updated and programmed into different pages of the same or different memory block. Accordingly, the write data stored in the to previous pages of the memory block may become invalid data, and thus the previous pages of the memory block may become invalid pages. If invalid pages are included in memory blocks of the memory device 150 as described above, an operation for processing data, for example, garbage collection (GC) may be performed between the memory blocks of the memory device 150 in order to maximize a use efficiency of the memory device 150. An example in which the GC for a data program into the memory blocks of the memory device 150 will be described in more detail below.

The controller 130 may perform a data processing operation in the memory system as will be described below. For example, the processor 134 of the controller 130 may perform the data processing through the FTL, as described above. For example, the processor 134 may search the memory blocks of the memory device 150 for valid pages through the FTL and generate an empty memory block, an open memory block, or a free memory block by performing a GC operation.

In an embodiment of the present invention, the controller 130 may store the write data, corresponding to the write command received from the host 102, in the buffer included in the memory 144 and then may program the data stored in the buffer into a page of a specific memory block among the plurality of memory blocks included in the memory device 150. For example, the controller 130 may write the data stored in the buffer of the memory 144 into the first page of a first memory block of the memory device 150 by performing a program operation.

Furthermore, when the controller 130 receives a write command for the first page of the first memory block, from the host 102, the controller 130 may perform a program operation on the data stored in the first page of the first memory block. For the data program operation the controller 130 may store the data of the first page in a different page of the same memory block or in a page of a different memory block. For example, the data of the first page may be stored in a second page of the first memory block or in a first page of a second memory block. In this case, the controller 130 may treat data stored in the previous page of the memory block, for example, the data stored in the first page of the first memory block as invalid data. Also, the first page of the first memory block may become an invalid page.

Furthermore, in an embodiment of the present invention, a data processing operation may include a garbage collection performed on the memory blocks of the memory device 150 as is described as an example below. For example, in a data processing operation, the controller 130 may copy data and store the copied data between the memory blocks of the memory device 150. The controller 130 may copy the data of valid pages (i.e., valid data) included in the memory blocks and store the copied data in memory blocks on which a data program has not been performed, such as an empty memory block, an open memory block, or a free memory block. The copying and storing operations may be performed by taking into consideration invalid pages in the memory blocks on which the data programs have been completed, in other words, the memory blocks in which data write operations have been completed for all the pages included in each of the memory blocks (i.e., closed memory blocks on which the data programs have been performed).

In an embodiment, an update program may be performed on the data stored in the memory blocks of the memory device 150, that is, a data processing operation in which a write command for data stored in the memory blocks may be received from the host 102 and write data corresponding to the write command may be programmed into the memory blocks of the memory device 150.

An example of a GC operation will be described in more detail below. Accordingly, in the GC, a memory block for data processing, for example, a source memory block may be identified from closed memory blocks in the memory device 150. Then, data stored in the source memory block may be copied and stored in a target memory block, such as an empty memory block in which data programs have not been performed on all the pages included in the memory block (also referred to often as an open or free memory block). An erase operation may be performed on the source memory, thereby generating the source memory as the empty, open or free memory block.

Referring to FIG. 12, the controller 130 may store write data corresponding to the write command received from the host 102, in the buffer included in the memory 144 of the controller 130 and may program the write data stored in the buffer, into a plurality of memory blocks, for example, a block0 1210, a block1 1220, a block2 1230, and a blocki 1240, selected as a user data block 1200.

Each of the plurality of memory blocks of the memory device 150 may include a plurality of pages as described above. In an embodiment of the present invention, when an update program is performed on data stored in the memory blocks of the memory device 150, the map data for the memory blocks corresponding to the update program may be generated. For example, when the write data corresponding to the write command received from the host 102 is programmed into the block0 1210, the block1 1220, the block2 1230, and the blocki 1240 of the user data block 1200 of the memory device 150, i.e., when a command operation is performed, the map data corresponding to the command operation, for example, a first map data including logical to physical (L2P) (hereinafter referred to as "logical information") and a second map data including physical to logical (P2L) (hereinafter referred to as "physical information") may be generated, and the memory blocks may be updated. The generated map data may be stored in the first and second blocks 1310 and 1320 of the map block 1300 of the memory blocks of the memory device 150. In this case, the first map data including logical map segment information corresponding to the command operation, for example, L2P segments may be stored in the first block 1310. The second map data including physical map segment information corresponding to the command operation, for example, P2L segments may be stored in the second block 1320.

In this case, in an embodiment of the present invention, when the update program is performed on the data stored in the memory blocks of the memory device 150, according to the update program for the memory blocks information indicating how many valid pages are reduced in the memory blocks of the memory device 150, in other words, information indicating how many invalid pages are generated (i.e., invalid page update information) may be included in a map list.

The controller 130 may perform data processing between the memory blocks of the memory device 150 by taking into consideration the invalid page update information included in the map list.

For example, in an embodiment of the present invention, the invalid page update information corresponding to each of the memory blocks of the memory device 150 may be included in the map list in a bit map, touch map or touch count bitmap form. A memory block for data processing, for example, a source memory block may be selected from the memory blocks of the memory device 150 based on the invalid page update information of the map list. Data corresponding to a valid page of the source memory block, (i.e., valid data) may be copied and stored in a target memory block.

In this case, the controller 130 may store the map list in the memory 144 of the controller 130 or store the map list in a certain one to of the memory blocks of the memory device 150. A first map data, including map information indicating that read/write data has been stored in the memory device 150 (e.g., map information as storage information about the read/write data), address information, page information, and logical information may be stored along with second map data including physical information in the certain memory block in which the map list may be stored. Alternatively, meta data including the first map data and the second map data may be stored in the certain memory block in which the map list may be stored.

For example, more specifically, each of the plurality of memory blocks of the memory device 150, for example, each of the block0 1210 the block1 1220, the block2 1230, and the blocki 1240 of the user data block 1200 of the memory block 150 may include a plurality of pages. Hereinafter, it is exemplarily described in more detail that the memory blocks block0 1210, block1 1220, and block2 1230 of the plurality of memory blocks of the memory device 150 may be closed memory blocks whereas the block blocki 1240 of the memory device 150 may be a target memory block.

Furthermore, when an update program is performed on a plurality of memory blocks of the memory device 150, for example, the block0 1210, the block1 1220, the block2 1230, and the blocki 1240 using data stored in the memory blocks as described above, the controller 130 may update the map data for the block0 1210, the block1 1220, the block2 1230, and the blocki 1240 according to the update program. For example, the controller 130 may update first map data for the update-programmed data in the block0 1210, the block1 1220, the block2 1230, and the blocki 1240. Furthermore, the controller 130 may include in a map list 1250 information indicating that invalid pages have been generated in the memory blocks 1210, 1220, 1230, and 1240 and information indicative of the number of invalid pages generated in the memory blocks 1210, 1220, 1230, and 1240 (i.e., invalid page update information) according to the update program performed on the memory blocks 1210, 1220, 1230, and 1240 or the update performed on the first map data. The controller 130 may check the invalid page update information included in the map list and perform data processing between the memory blocks of the memory device 150.

For example, the controller 130 may include the invalid page update information indicative of the number of invalid pages generated in the closed memory blocks, in the map list 1250 in a bitmap, touch map, or touch count bitmap form according to the update program performed on the closed memory blocks among the plurality of memory blocks of the memory device 150, or the updating of the map data corresponding to the update program performed on the closed memory blocks.

In this case, the pieces of invalid page update information about the closed memory blocks of the memory device 150 may be stored in corresponding columns of the map list 1250, respectively. For example, in the block0 1210 to the block9 (i.e., the closed memory blocks), the invalid page update information about the block0 1210 may be stored in a first column 1252, the invalid page update information about the block1 1220 may be stored in a second column 1254, the invalid page update information about the block2 1230 may be stored in a third column 1256, the invalid page update information about the block3 may be stored in a fourth column 1258, the invalid page update information about the block4 may be stored in a fifth column 1260, the invalid page update information about the block5 may be stored in a sixth column 1262, the invalid page update information about the block6 may be stored in a seventh column 1264, the invalid page update information about the block7 may be stored in an eighth column 1266, the invalid page update information about the block8 may be stored in a ninth column 1268, and the invalid page update information about the block9 may be stored in a tenth column 1270.

Hereinafter, it is described in more detail that specific M times, for example, three update programs may be performed on the closed memory blocks of the memory device 150 or three updates may be performed on the map data for the closed memory blocks on which the three update programs are performed.

More specifically, when the controller 130 may perform the three update programs on each of the closed memory blocks of the memory device 150 or perform the three updates on the map data for the closed memory blocks of the memory device 150, the controller 130 to may store, in each of the columns of the map list 1250, invalid page update information about each of the closed memory blocks, for each index indicative of each of the closed memory blocks on which the update programs or the updates of the map data closed have been performed.

The controller 130 may check the number of the reduced valid pages in the closed memory blocks due to the three update programs or the three updates of the map data for the closed memory blocks. For example, the controller 130 may check the number of the generated invalid pages, and generate the map list 1250 by writing a valid page decrement count (i.e., an invalid page occurrence count 1360) indicating the number of invalid pages in a table of the map list 1250 for each index 1350 of the closed memory blocks, as shown in FIG. 13.

Figure 13:
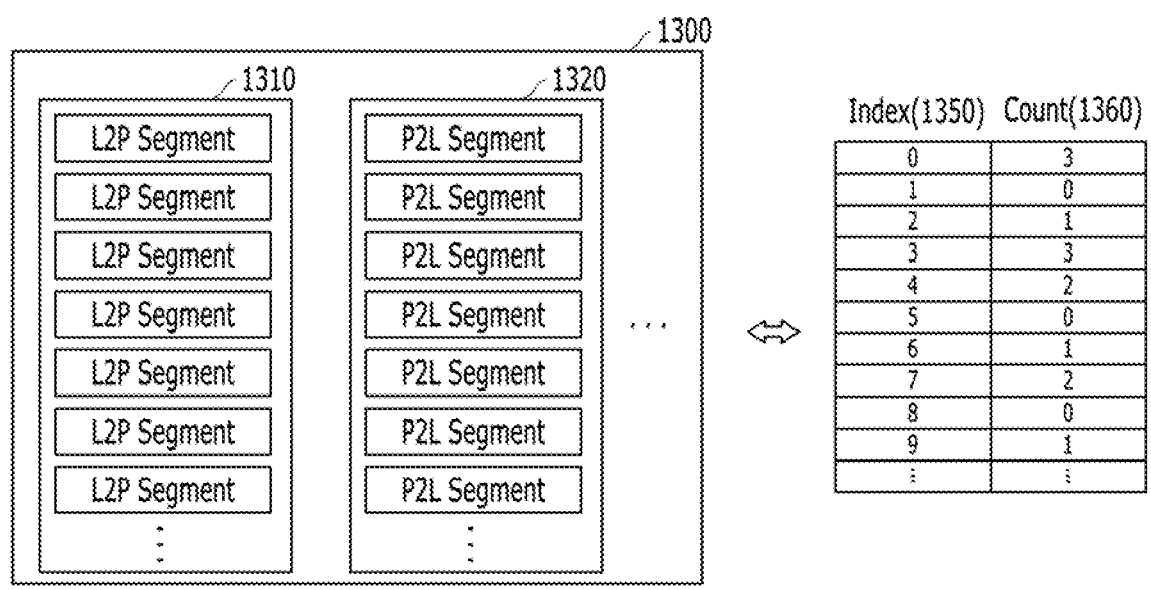

For example, the controller 130 may generate the map list 1250 by writing that the valid page decrement count or the invalid page occurrence count 1360 is "3" with respect to the index 1350 "0" of the closed memory block0, that the valid page decrement count or the invalid page occurrence count 1360 is "0" with respect to the index 1350 "1" of the closed memory block1, that the valid page decrement count or the invalid page occurrence count 1360 is "1" with respect to the index 1350 "2" of the closed memory block2, that the valid page decrement count or the invalid page occurrence count 1360 is "3" with respect to the index 1350 "3" of the closed memory block3, that the valid page decrement count or the invalid page occurrence count 1360 is "2" with respect to the index 1350 "4" of the closed memory block4, that the valid page decrement count or the invalid page occurrence count 1360 is "0" with respect to the index 1350 "5" of the closed memory block5 that the valid page decrement count or the invalid page occurrence count 1360 is "1" with respect to the index 1350 "6" of the closed memory block6, that the valid page decrement count or the invalid page occurrence count 1360 is "2" with respect to the index 1350 "7" of the closed memory block7, that the valid page decrement count or the invalid page occurrence count 1360 is "0" with respect to the index 1350 "8" of the closed memory block8, and that the valid page decrement count or the invalid page occurrence count 1360 is "1" with respect to the index 1350 "9" of the closed memory block9, in the table of the map list 1250 shown in FIG. 13. For example, the valid page decrement count or the invalid page occurrence count 1360 for each index 1350 of each of the closed memory blocks written in the table of the map list 1250 may be stored in each of the columns of the map list 1250 in a bitmap, touch map, or touch count bitmap form.

Furthermore the controller 130 may check the invalid page update information about the closed memory blocks, which may be stored in the map list 1250 in a bitmap, touch map, or touch count bitmap form. For example, the controller 130 may check the valid page decrement counts or the invalid page occurrence counts of the closed memory blocks caused by the update programs for the closed memory blocks or the updates of the map data for the closed memory blocks. Thereafter, when the controller 130 performs GC on the closed memory blocks of the memory device 150, it may check the invalid page update information about the closed memory blocks through the map list 1250. For example, the controller 130 may identify the valid page decrement counts or the invalid page occurrence counts in the closed memory blocks from the map list 1250. Among the closed memory blocks, the controller 130 may select closed memory blocks having closed a minimum valid page decrement count or invalid page occurrence count as a source memory block group. Furthermore, the controller 130 may check the valid pages in the closed memory blocks selected as the source memory block group to identify the valid page count (hereinafter referred to as a "VPC") of the closed memory blocks, select sequentially the closed memory blocks as the source memory block starting from a closed memory block having a minimum VPC, and perform the GC on the closed memory blocks selected as the source memory block.

For example, the controller 130 may check which of the closed memory blocks of the memory device 150 have a minimum valid page decrement count or invalid page occurrence count through the map list 1250. The controller 130 may select the closed memory blocks having the minimum valid page decrement count or invalid page occurrence count as a source memory block group. For example, with reference to FIG. 13, the controller 130 may select the closed memory block1, the closed memory block5, and the closed memory block8 having a valid page decrement count or invalid occurrence count of "0" as the source memory block group. The controller 130 may check the VPCs of the closed memory block1, the closed memory block5, and the closed memory block8 selected as the source memory block group. The controller 130 may select a source memory block from the closed memory blocks in the source memory block group, in which the selection of the source memory block may be made sequentially from a closed memory block having a minimum VPC to a closed memory block having a maximum VPC. For example, if the VPC of the closed memory block8 is a minimum and the VPC of the closed memory block1 is a maximum in the source memory block group, the controller 130 may sequentially select the closed memory blocks as the source memory block in the order of the closed memory block8, the closed memory block5, and the closed memory block1. Furthermore, the controller 130 may perform the GC on the source memory block. For example, the controller 130 may copy and store the data of valid pages included in the source memory block into a target memory block, such as, an empty memory block, an open memory block, or a free memory block in which a data program for all the pages of a memory block has not been performed. The controller 130 may then perform an erase operation on the source memory block to generate the source memory block as an empty memory block, an open memory block or a free memory block.

For example, in an embodiment of the present invention, the to controller 130 may check the valid page decrement counts or invalid page occurrence counts of the memory blocks of the memory device 150 according to the update programs performed on the memory blocks or the updates of the map data corresponding to the update programs through the map list 1250. Next, the controller 130 may select memory blocks having a minimum valid page decrement count or invalid page occurrence count as a source memory block group. Then, the controller 130 may select sequentially source memory blocks from the memory blocks in the source memory block group starting from a memory block having a minimum VPC, and perform the GC on the memory blocks. Accordingly a source memory block on which the GC will be performed may be selected more rapidly and efficiently, the GC may be performed efficiently, and the use efficiency of memory blocks included in the memory device 150 may be maximized.

Figure 14:
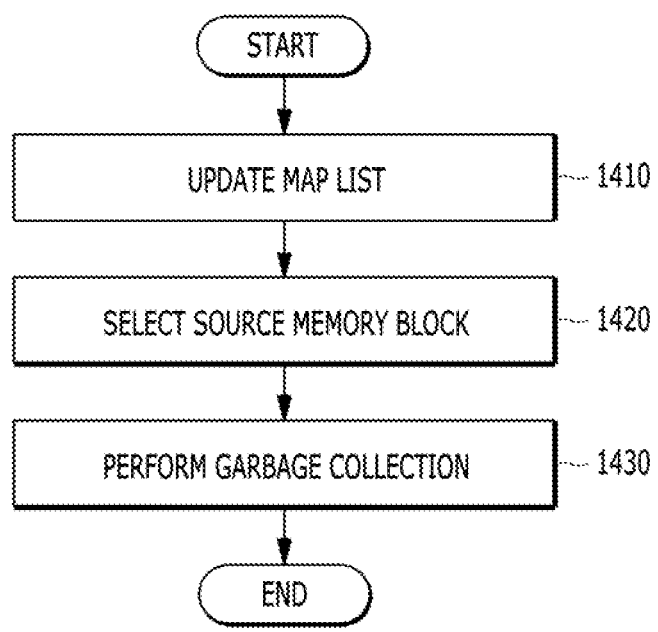
FIG. 14 is a flowchart of a data processing operation, according to an embodiment of the present invention.

FIG. 14 is a flowchart illustrating an operation for process data according to an embodiment of the present invention.

Referring to FIG. 14, at step 1410, when a write command corresponding to data stored in the memory blocks of the memory device is received from the host, the memory system may program and store the data corresponding to the write command, in another specific memory block of the memory blocks of the memory device. For example, after performing the update programs, the memory system may update the memory blocks and store in the map list the update programs or invalid page update information indicative of the number of the reduced valid pages or the number of the generated invalid pages in the memory blocks according to the update program.

Furthermore, at step 1420, the memory system may select source memory blocks on which the GC will be performed from the memory blocks of the memory device based on the map list. In this case, the memory system may check invalid page update information (e.g., the number of valid pages reduced in the closed memory blocks of the memory device or the number of invalid pages generated in the closed memory blocks) about each of the closed memory blocks, which is stored in each of the columns of the map list. The memory system may sequentially select the closed memory blocks starting from a closed memory block having a minimum number of valid pages or a minimum number of invalid pages, and sequentially select the selected closed memory blocks as the source memory blocks starting from a closed memory block having a minimum VPC.

Thereafter, at step 1430, the memory system may perform the GC on the memory blocks of the memory device. More specifically, the memory system may perform the GC for generating the selected source memory blocks as target memory blocks, for example, empty memory blocks by copying and storing data stored in the valid pages of the selected source memory blocks in the target memory blocks and then performing an erase operation on the source memory blocks.

In this case, the generation of invalid page update information about the memory blocks of the memory device and the map list including the invalid page update information, the updating of the memory blocks using the invalid page information and the map list, the checking of the invalid page update information about the memory blocks through the map list, the selection of the source memory blocks based on the invalid page update information, and the execution of the GC for the memory blocks of the memory device have been described in detail with reference to FIGS. 12 and 13, and thus a detailed description thereof is omitted.

The present invention provides a memory system and an operating method thereof that may reduce the complexity of data processing operations and the performance requirements of the memory system by maximizing the use efficiency of the memory system. As a result data may be processed to and from the memory system more rapidly and stably than with existing systems.

Although various embodiments have been described for illustrative purposes, it will be apparent to those skilled in the relevant art that various changes and modifications may be made without departing from the spirit and or scope of the invention as defined in the following claims.

What is claimed is:

1. A memory system, comprising:
   a memory device comprising a plurality of memory blocks, each memory block comprising a plurality of pages each page having a plurality of memory cells coupled to a plurality of word lines, the memory device being suitable for storing data requested by a host; and
   a controller suitable for:
      receiving a write command for data programmed into a first memory block the first memory block comprises closed memory blocks in which a data program for all pages of the closed memory blocks has been performed—from the host;
      performing an update program on the data programmed into the first memory block into the memory blocks;
      generating a map list for the first memory block according to the update program; and
      checking an update program count of each of the closed memory blocks,
   wherein the update program count of a closed memory block increases by 1 when a valid page count (VPC) is updated in the closed memory block through the map list according to the update program of the closed memory block.

2. The memory system of claim 1, the controller being further suitable for:
   updating map data for the first memory block in accordance with the update program; and
   storing the update program count of the first memory block according to the updating of the map data or the update program in the map list.

3. The memory system of claim 2, wherein:
   the map list comprises a plurality of columns corresponding to the memory blocks, respectively; and
   the update program count of each of the memory blocks is stored in each of the columns of the map list in a bit map, touch map, or touch count bitmap form.

4. The memory system of claim 1, wherein the controller is suitable for sequentially selecting the closed memory blocks as a source memory block group, wherein the selections of the closed memory blocks as the source memory block group are sequentially made from a closed memory block having a minimum update program count to a closed memory block having a maximum update program count.

5. The memory system of claim 4, wherein the controller is suitable for:
   checking the VPC of each of the closed memory blocks selected as the source memory block group; and
   sequentially selecting source memory blocks from the closed memory blocks in the source memory block group, wherein the selections of the source memory blocks are made from a closed memory block having a minimum VPC to a closed memory block having a maximum VPC.

6. The memory system of claim 5, wherein the controller is suitable for:
   copying data stored in valid pages of the source memory blocks,
   storing the copied data in empty memory blocks, open memory blocks, or free memory blocks of the memory blocks, and
   generating the source memory blocks as the empty memory blocks, the open memory blocks, or the free memory blocks.

7. The memory system of claim 1, wherein the map list comprises a table in which counts have been written for each index indicative of each of the closed memory blocks.

8. An operating method of a memory system, comprising:
   receiving a first write command from a host with respect to a plurality of pages included in each of a plurality of memory blocks of a memory device wherein each of the plurality of page comprises a plurality of memory cells;
   receiving a write command for data programmed into a first memory block the first memory block comprises closed memory blocks in which a data program for all pages of the closed memory blocks has been performed—from the host;
   performing an update program on the programmed data of the first memory block into the memory blocks;
   generating a map list for the first memory block in accordance with the update program; and
   checking an update program count of the respective closed memory blocks,
   wherein the update program count of a closed memory block increases by 1 when a valid page count (VPC) is updated in the closed memory block through the map list according to the update program of the closed memory block.

9. The operating method of claim 8, wherein the generating of the map list comprises:
   updating map data for the first memory block in accordance with the update program, and storing the update program count of the first memory block according to the updating of the map data or the update program in the map list.

10. The operating method of claim 9, wherein:

the map list comprises a plurality of columns corresponding to the memory blocks, respectively; and the update program count of each of the memory blocks is stored in each of the column of the map list in a bit map, touch map, or touch count bitmap form.

11. The operating method of claim 8, further comprising sequentially selecting the closed memory blocks as a source memory block group, wherein the selections of the closed memory blocks as the source memory block group are sequentially made from a closed memory block having a minimum update program count to a closed memory block having a maximum update program count.

12. The operating method of claim 11, wherein the sequentially selecting of the closed memory blocks comprises:

checking the VPC of each of the closed memory blocks selected as the source memory block group, and sequentially selecting source memory blocks from the closed memory blocks in the source memory block group, wherein the selections of the source memory blocks are made from a closed memory block having a minimum VPC to a closed memory block having a maximum VPC.

13. The operating method of claim 12, further comprising:

copying data stored in valid pages of the source memory blocks, storing the copied data in empty memory blocks, open memory blocks, or free memory blocks of the memory blocks, and generating the source memory blocks as the empty memory blocks, the open memory blocks, or the free memory blocks.

14. The operating method of claim 8, wherein the map list comprises a table in which counts have been written for each index indicative of each of the closed memory blocks.

* * * * *